UNITED STATES PATENT OFFICE.

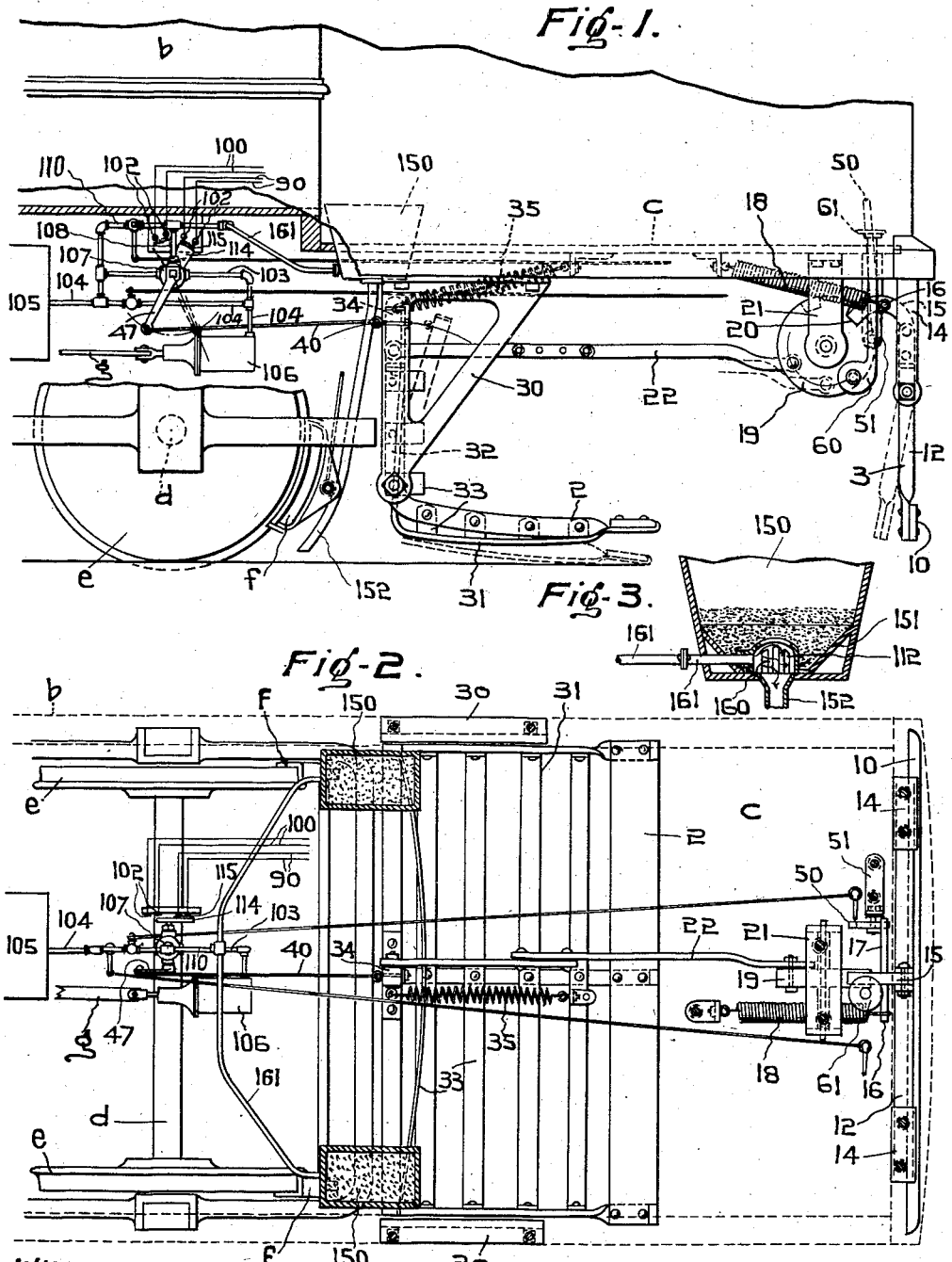

NORMAN J. HOLDEN, OF MONTREAL, QUEBEC, CANADA.

CAR-FENDER.

1,010,428. Specification of Letters Patent. Patented Dec. 5, 1911.

Application filed August 28, 1911. Serial No. 646,318.

*To all whom it may concern:*

Be it known that I, NORMAN J. HOLDEN, residing at Montreal, in the Province of Quebec, Dominion of Canada, have invented certain new and useful Improvements in Car-Fenders, of which the following is a specification.

My invention relates particularly to car fenders of the type embodying means for applying the brakes in unison with the operation of the fender; and it has for its object to provide a fender of this type adapted to cause the brakes to be applied, the power to be reversed and the sand projected upon the rails before the scoop fender reaches the object struck.

The invention may be said to consist of the construction, combination and particular arrangement of parts hereinafter described and pointed out in the claims.

For full comprehension, however, of my invention, reference must be had to the accompanying drawings forming a part of this specification, in which similar reference characters indicate the same parts and wherein:

Figure 1 is a side elevation and part sectional view of the front portion of a tram-car provided with a fender embodying my invention and ready for action; Fig. 2 is a plan view thereof with the body of the car and platform removed; and Fig. 3 is a detail vertical sectional view of one of the sand bins.

The body *b*, platform *c*, axle *d*, wheels *e*, brake-shoes *f*, electric wiring for power, and an emergency air-brake system of which a portion only is illustrated at *g*, may be of any preferred construction and are not described in detail.

According to my invention, a scoop fender 2 located in close proximity to the front wheels, and a trip-fender 3 placed at the extreme front end of the platform, are employed in conjunction with the air-brake system, electric power and a pneumatic sander, and means are provided whereby when the trip fender comes into contact with an object upon the track, the brakes will be applied, power reversed and sand projected, before the fender reaches the object, thereby materially lessening the shock and facilitating the retention of the object by the scoop fender.

The trip fender consists of a horizontal bar 10 carried by a U-frame 12 fulcrumed to a pair of bracket arms 14 fastened to the extreme front end of the platform *c*. The middle of this trip fender has an upwardly extending and rearwardly curved rigid pawl 15 having laterally projecting pins 16 and 17, one, 16, of which has connected thereto a retractile spring 18 the opposite end whereof is fastened rearwardly to the underside of the platform. A locking disk 19, having a notch 20 engageable by the pawl 15, is rotatably carried between the arms of an inverted U-bracket 21 secured upon the under side of the platform, and it is operatively connected to the scoop by a rigid link 22.

The scoop fender consists of an angular member pivotally supported between the lower ends of a pair of depending bracket arms 30 located in close proximity to front wheels, the portion 31 thereof, which is normally horizontal, being dished, and the vertical portion 32 is provided with horizontal resilient strips 33 and a rigid vertical arm 34 having the rigid link 22 pivotally connected to the lower portion thereof, and a retractile spring 35 has its ends connected to the upper end thereof, and forwardly to the under side of the platform respectively, the upper end of this arm being connected by a rod 40 to a combination lever 47 in operative relation with the power circuit, sander, and air brake mechanism.

Suitable wiring is provided for the reversal of the power upon the movement of a switch member. This wiring may consist of a series of leads 90, 90 and 100, 100 connected to switch terminals 102, the leads 90, 90 coming from the "forward" terminals of the controller box (not shown), and the leads 100, 100 from the "reverse" terminals thereof. The brake-pipe 104, leading from the reservoir 105 to the brake cylinder 106, has a by-pass 103. This by-pass is controlled by a three-way valve 107, from the chamber of which a branch 108 leads to the pipe 110, furnishing a blast to a pneumatic sander 160, the stem of this valve projecting through the casing and having an arm 114 with a contact piece 115 carried thereby, and insulated therefrom. The relative positions of the valve 107, arm 114, and switch terminals 102, are such that the valve will be closed and the power directed for forward travel when the combination lever 47 is in the position it is caused to assume when the fender is set ready for action; and the throw of the lever and the contact arm is such that the current will be reversed and the valve admit air to the brake cylinder and to the sander simultaneously with the touching of an object by the trip-fender.

The sander illustrated consists of the usual bin 150 located in the motor-man's cab. It has a hopper-bottom 151 from which a branched conductor pipe 152 leads to a point in close proximity to the rails and the front of the front wheels. The mouth of this pipe is covered, within the bin by an agitator chamber 160 having slots 112 and with which a branched pipe 161 connects, the compressed air pipe 104 being coupled by a pipe 110 to this branched pipe 161. Agitation of the sand in the chamber is caused by the impact of the air on the walls of the cavity in the mass of sand and surrounding the chamber, and the whirling effect due to the circular form of the latter. In this manner the speed of the car is materially checked, if not brought to an absolute stop, between the time the trip fender touches an object and the scoop fender reaches it, with the result that injury to the object is prevented, and it is prevented from rolling off the scoop fender and being ridden over thereby and cut up by the wheel.

In order to enable the motor-man to apply the brakes and simultaneously drop the fender on an emergency, and readily restore the air-brake system, power system, sander, and fender to normal condition, a foot lever 50 is fulcrumed to the lower end of a bracket arm 51 extending below the level of the pin 17 of the locking pawl and is secured to the under side of the car platform, such lever projecting upwardly a short distance through a slot in the platform and being located in a position to have this pin 17 extend across it; and a plunger bar 60 with a foot piece 61 on its upper end extends downwardly through the platform and is pivotally connected to the locking disk in an angular position so as to place the lower end of the bar 60 in a substantially horizontal line with the center of the disk when the brakes are applied.

What I claim is as follows:—

1. In a car the combination with a trip-fender, an air-brake system, a pneumatic sander and electric power system, of means whereby the said brake system and sander are operated and the power reversed simultaneously with the movement of the trip-fender.

2. In a tram-car the combination with an air-brake system, a sander, and electric power system, of a displaceable member suspended from the underside of the extreme front of the car, a scoop-fender carried beneath the car body and in close proximity to and in front of the front wheels, and means whereby upon displacement of the displaceable member the air-brake and the sander will be operated and the power reversed before the scoop-fender reaches the point at which the said member was displaced, substantially as described.

3. In an electric tram-car having an air-brake system the combination with a trip-fender, of a combination lever mounted on the car, means operatively connecting the fender to the lever, a valve controlling the air-brake system, a device carried by the movable part of the valve, and adapted to control the electric power, and means operatively connecting the lever to the valve.

In testimony whereof I have signed my name to this specification in the presence of two witnesses.

NORMAN J. HOLDEN.

Witnesses:
 HENRY UPTON,
 R. G. CRANE.

---

Copies of this patent may be obtained for five cents each, by addressing the "Commissioner of Patents, Washington, D. C."